US 6,615,156 B2

United States Patent
Elliott et al.

(10) Patent No.: US 6,615,156 B2
(45) Date of Patent: Sep. 2, 2003

(54) ABNORMAL STATE ABSOLUTE POSITION DETECTOR GENERATING DIRECT DIGITAL OUTPUT

(75) Inventors: Lynn H. Elliott, Houston, TX (US); Gerald W. Scalf, Houston, TX (US); Jason R. Lowery, Houston, TX (US)

(73) Assignee: EIM Company, Inc., Missouri City, TX (US)

( * ) Notice: Subject to any disclaimer, the term of this patent is extended or adjusted under 35 U.S.C. 154(b) by 0 days.

(21) Appl. No.: 10/164,328

(22) Filed: Jun. 5, 2002

(65) Prior Publication Data

US 2002/0161548 A1 Oct. 31, 2002

Related U.S. Application Data

(63) Continuation of application No. 09/595,368, filed on Jun. 15, 2000, now Pat. No. 6,424,928.

(51) Int. Cl.[7] .................................................. G01B 7/14
(52) U.S. Cl. ......................... 702/151; 702/33; 702/36; 702/41; 702/94; 702/113; 702/115
(58) Field of Search ............................ 702/33, 36, 40, 702/41, 57, 94, 95, 113–115, 123, 150–153, 158, 159, 163, 182, 183, 184, 188, FOR 103–FOR 104, FOR 123–FOR 124, FOR 134–FOR 136, FOR 144, FOR 146, FOR 155, FOR 170; 340/3.6, 3.51, 870, 870.11, 870.13; 74/DIG. 7; 346/18; 33/1 PT, 1 N; 323/307; 324/207.21, 207.251, 173, 174

(56) References Cited

U.S. PATENT DOCUMENTS

| | | | |
|---|---|---|---|
| 3,226,711 A | 12/1965 | Lautzenhiser | |
| 3,531,798 A | 9/1970 | Bureau | |
| 4,262,251 A | * 4/1981 | Fujishiro et al. | ........ 324/207.25 |
| 4,357,662 A | * 11/1982 | Schira et al. | ................ 601/111 |
| 4,427,972 A | 1/1984 | Haville et al. | |
| 4,533,902 A | * 8/1985 | Baker et al. | .................... 341/9 |
| 4,536,762 A | 8/1985 | Moates | |
| 4,691,192 A | 9/1987 | Baker | |
| 4,697,168 A | 9/1987 | Baker | |

(List continued on next page.)

Primary Examiner—Marc S. Hoff
Assistant Examiner—Carol S W Tsai
(74) Attorney, Agent, or Firm—Vinson & Elkins L.L.P.

(57) ABSTRACT

An absolute position detector that interprets, rather than avoids, abnormal sensory states. Different combinations of sensors in an array are activated as a marker travels along a path. The current activation/deactivation state of the array is converted into a digital signal that is reliably indicative of the current absolute position of the marker along the path. In a preferred embodiment, a dynamic magnetic field is provided whose current condition represents the current absolute position of a moving marker. As the marker moves, the condition of the field changes to activate different groups of Hall Effect devices in an array. The activated groups may comprise one or more Hall Effect devices in the array, depending on the condition of the field as created by the position of the marker. The current activation/deactivation state of the array is then converted, advantageously via truth table logic, into a digital signal representative of the current position of the marker.

84 Claims, 6 Drawing Sheets

U.S. PATENT DOCUMENTS

| | | | |
|---|---|---|---|
| 4,728,950 A | | 3/1988 | Hendrickson et al. |
| 4,737,710 A | | 4/1988 | Van Antwerp et al. |
| 4,752,449 A | * | 6/1988 | Jackson et al. ............... 422/73 |
| 4,774,464 A | | 9/1988 | Kubota et al. |
| 4,845,486 A | * | 7/1989 | Knight et al. ............... 340/618 |
| 4,851,771 A | | 7/1989 | Ikeda et al. |
| 4,901,072 A | | 2/1990 | Fox |
| 4,942,394 A | | 7/1990 | Gasiunas |
| 4,990,909 A | | 2/1991 | Ueda et al. |
| 5,003,261 A | * | 3/1991 | Kim ..................... 324/207.25 |
| 5,012,673 A | * | 5/1991 | Takano et al. ............. 73/118.1 |
| 5,029,304 A | | 7/1991 | Tolmie, Jr. |
| 5,038,243 A | | 8/1991 | Gordon |
| 5,049,879 A | | 9/1991 | Symonds |
| 5,062,062 A | * | 10/1991 | Nishibe et al. ............... 702/41 |
| 5,084,674 A | * | 1/1992 | Lachmann et al. ......... 324/174 |
| 5,211,539 A | * | 5/1993 | McCarty ..................... 416/61 |
| 5,235,181 A | * | 8/1993 | Durana et al. ......... 250/231.18 |
| 5,243,279 A | * | 9/1993 | Bajat et al. ............ 324/207.21 |
| 5,438,330 A | | 8/1995 | Yamazaki et al. |
| 5,457,371 A | | 10/1995 | Gordon |
| 5,475,299 A | * | 12/1995 | Leon ......................... 324/73.1 |
| 5,519,393 A | | 5/1996 | Brandestini |
| 5,544,000 A | * | 8/1996 | Suzuki et al. ............... 361/139 |
| 5,568,048 A | * | 10/1996 | Schroeder et al. ..... 324/207.21 |
| 5,640,007 A | | 6/1997 | Talbott et al. |
| 5,663,557 A | | 9/1997 | Morita et al. |
| 5,668,331 A | | 9/1997 | Schintag et al. |
| 5,681,331 A | * | 10/1997 | de la Torre et al. ........ 606/148 |
| 5,681,990 A | | 10/1997 | Hampo et al. |
| 5,739,775 A | | 4/1998 | Brandestini |
| 5,880,683 A | | 3/1999 | Brandestini |
| 5,900,727 A | * | 5/1999 | Griffen et al. ............... 324/173 |
| 6,006,149 A | * | 12/1999 | Salecker et al. ............... 701/51 |
| 6,064,199 A | * | 5/2000 | Walter et al. ............ 324/207.2 |
| 6,181,410 B1 | * | 1/2001 | Ishida et al. ............... 356/4.01 |
| 6,246,258 B1 | * | 6/2001 | Lesea ........................ 326/39 |
| 6,405,611 B1 | * | 6/2002 | DeJonge et al. ............. 74/335 |

\* cited by examiner

ABNORMAL STATE ABSOLUTE POSITION DETECTOR GENERATING DIRECT DIGITAL OUTPUT

This application is a continuation of commonly-invented, commonly-assigned U.S. patent application ABSOLUTE POSITION DETECTOR INTERPRETING ABNORMAL STATES, Ser. No. 09/595,368, filed Jun. 15, 2000, now U.S. Pat. No. 6,424,928, to Elliott et al., issued on Jul. 23, 2002.

TECHNICAL FIELD OF THE INVENTION

This application relates generally to absolute position detectors, and in particular to an absolute position detector that interprets, rather than avoids, abnormal sensory states.

BACKGROUND OF THE INVENTION

In simple systems, an absolute position detector (APD) is generally used to determine the position of a moving component along a path of travel. The APD typically accomplishes this via detection of the current position of a marker affixed to or associated with the component. In more sophisticated systems, the APD is further used to determine the positional state of an assembly of interrelated moving components, such as gears, via resolution of the combined current position of a series of markers on the interrelated moving components.

APDs are commonly used in connection with an assembly of multiple rotating gears, such as may be found, for example, in valve actuator mechanisms. In a valve actuator, an APD generally detects the positional state of a series of interrelated circular gears, the positional state representative of the degree of openness of the valve. In such cases the APD monitors the paths of circular travel of markers on the interrelated gears.

Such circular travel is by no means the only type of motion monitored by APDs, however. APDs may be used to monitor position, for example, on other shaped closed loop paths, such as elliptical or irregular closed loop paths. Alternatively, APDs may be used to measure position on straight or curved paths that are not on a closed loop. Travel along such open paths may or may not be reciprocating. For example, APDs can be used to measure the state of a torque sensor in a valve actuator via monitoring of the current position of a member traveling along a pendulum-like path.

It is also well understood that absolute position detection is a dynamic operation. Successive samples of a current positional state may be resolved into a stream that forms a dynamic control tool.

The advent of computerized control has increased the need for APDs that generate high speed streams of samples that indicate current positional states in digital format. The speed and capacity of modern computers allow positional samples to be processed at a high speed. There is a particular need for APDs that generate samples at that speed. The faster the stream of samples that is processed, the finer the resolution of monitoring and control of the positional state.

For this reason, APDs relying on mechanical systems, such as cams to activate a switch or a potentiometer, are fast becoming obsolete. These devices have always suffered from backlash because of the mechanical load on the components. Wear and tear on the mechanical parts has always tended to shorten operational life. On top of these inherent drawbacks, such mechanical APDs tend not to be robust enough to be able to be operated at high speeds.

The prior art has addressed the problems of mechanical APDs by teaching use of non-contact APDs, such as those described in U.S. Pat. No. 5,640,007. This patent describes an optical encoder in which a plurality of encoder wheels each contain a series of openings that pass by a light emitting device as the gears are turned. As light is shined through these openings and detected, the openings through which light is transmitted encodes the position of the wheels, and this code is compared to a defined code sequence to determine the position of a rotatable shaft functionally connected to the position detector.

Certain types of detectors have also utilized magnetic fields to encode the position of a device and to determine the position of a rotatable shaft. A magnetic sensor apparatus is described in U.S. Pat. No. 4,728,950. The device described in the '950 patent addresses the problem of automation of reading decimal gears, such as the type normally used in utility meters, in which each higher order digit is displaced in a 10 to 1 ratio relative to the lower digit. The devices described teach use of Hall Effect sensor devices to detect the magnetic field of a magnet attached to each digit gear. In the devices described, each gear has a permanent magnet attached thereto, and an array of 10 Hall Effect sensor devices are placed in a circular array with respect to each gear, so that the magnets pass over the sensor devices in succession as the gears turn. The resulting coded output of the sensor devices is read in a linear fashion, such that the reading of the position of the higher gears are dependent on the readings of the lower gears.

Both of the '007 and '950 inventions rely exclusively on normal state recognition, and indeed go to great lengths to avoid abnormal states. This reliance on normal state recognition is typical of prior art APDs. The term "normal state" refers to an environment in which preselected individual sensors, and often single individual sensors, are associated with a corresponding number of discrete absolute positions available to a source. Whenever the source occupies one of those positions and activates solely the designated sensor or group of sensors for that position, the APD is in a "normal state." In contrast, whenever the source is between those positions in its path of travel, or otherwise activates more than one designated sensor or group of sensors at the same time, the APD is in an "abnormal state."

Returning to the '007 and '950 patents, these inventions are characteristic of the traditional prior art approach using exclusively normal state position detection. A key feature of these prior art inventions is to ensure that stray or unfocused emissions from the source are not recorded in error by the wrong sensor, i.e. a sensor other than the one designed to be indicative of the current absolute position. In the case of the '007 patent, reflective surfaces are used to focus light through the apertures and onto the light sensing devices. In the case of the '950 patent, a three-pole magnet is used to focus the magnetic field onto single Hall Effect devices in predefined normal states.

Sole reliance on normal state detection imputes a number of drawbacks and inherent limitations on APDs. First, the resolution of the APD is limited to the number of discrete sensors deployed. The APD can measure no finer a resolution than the predefined number of normal states monitored for. Further, structural or space limitations may dictate that less than an optimal number of sensors can be deployed on a particular moving component.

Second, while stray and erroneous sensory readings can perhaps be minimized, they can never truly be eradicated. This is especially true for a safe, low-cost sensory medium such as magnetic flux, which exists in more of a field than a directed beam. This is further especially true in high speed environments where the transitions between successive normal states become harder to identify. Thus, APDs relying solely on normal state detection necessarily include a lot of structure minimizing the effect of the inevitable. This structure adds to the cost and complexity of the APD, while possibly detracting from overall robustness.

This prior art tendency towards "extra structure to minimize the inevitable" is highlighted in U.S. Pat. No. 4,737, 710. A complex combination of Hall Effect device placements, stray flux shielding, and signal adaptation circuitry is disclosed to purify detection of normal states in high speed service. It is nonetheless a fact that APDs such as illustrated in the '710 patent exist in an abnormal state most of the time. Except when a source is momentarily directly in communication with a single sensor, the APD is effectively between sensors, and thus by definition in an abnormal state. Sole reliance on normal state detection may therefore not always be the most optimal approach.

It will therefore be appreciated that an APD that interprets detection of abnormal states, rather than avoiding them, would be highly advantageous. The disadvantages of sole reliance on normal state detection as described above would be obviated. Further, such an APD would further have good application to high speed service.

Moreover, reliance on detection of both normal and abnormal states presents opportunities for additional novelty in the process of decoding the physical state of an array of sensors into a signal suitable for digital processing. Although decoding techniques known in the art could be used, it would be further advantageous to have a decoding technique available that specifically enhances the performance and error-detection security of an APD interpreting both normal and abnormal states.

SUMMARY OF THE INVENTION

These and other objects and advantages are provided by an absolute position detector that interprets, rather than avoids, abnormal sensory states. The inventive APD allows a source to activate different combinations of sensors in an array as a marker travels along a path. The marker may be the source itself, or alternatively a moving window interposed between the sensors and a substantially stationary source. The current activation/deactivation state of the array is converted into a digital signal that is reliably indicative of the current absolute position of the marker along the path.

In a first embodiment, arrays of Hall Effect devices monitor a dynamic magnetic field whose current condition represents the current absolute position of a series of magnets traveling on a set of interrelated circular gears. In operation of the first embodiment, the current relative position of the magnets on the gears generates a specific momentary magnetic field, which in turn activates a specific group of Hall Effect devices in the combined arrays. The activated group may comprise one specific or more Hall Effect devices in each of the combined arrays, depending on the condition of the magnetic field. The current activation/deactivation state of the array is sampled, and then converted, advantageously via truth table logic, into a digital signal representative of the current positional state of the gears.

In a second embodiment, arrays of Hall Effect devices monitor the pendulum-like motion of a member in reciprocating travel along an open path. The position of the member on the path indicates a detected level of torque. Again, magnets are disposed on the member so as to create different activation/deactivation states in the arrays according to different positions of the member. Truth table logic then converts the current activation/deactivation state of the array into a digital signal representative of the detected level of torque associated with the current position of the member.

As noted, both of the APD embodiments described herein practice the APD invention by detecting and encoding absolute positions via sampling the condition of sensor arrays that may be in normal and abnormal states. The conversion of these encoded absolute positions to a digital signal is actually achieved by decoding the condition of each of the sensors in the sensor array and applying truth table logic. It will be understood that this decoding function may be achieved by any preselected decoding technique that identifies the current state of the sensor array and then converts it to a computer processable code, such as binary code, Gray code, V-scan code, or alternatively a customized or proprietary code.

The APD invention according to one aspect is therefore embodied in a device for detecting the positional state of an incrementing multi-gear assembly, comprising:
  an assembly of components in geared relationship, each component disposed to rotate, said geared relationship enabling the rotation of one component to increment a next component in sequence;
  a plurality of said components each including a system further comprising:
    a source affixed to the component and traveling along a predefined circular path as said component rotates; and
    an array of at least three sensors deployed equidistantly around the path of the source, different combinations of sensors within the array disposed to become activated and deactivated via sensory communication with the source as the source travels its path, said different combinations ranging from one sensor to multiple sensors activated by the source at different times during travel along the path by the source; and
  a converter, the converter disposed to convert current combined activation/deactivation states of sensors in each system into a digital signal representative of a current overall positional state for the assembly.

According to a second aspect, the APD invention is further embodied in a method for establishing the position of a marker disposed to travel along a predefined path, the method comprising: (a) deploying an array of at least two sensors along at least a part of the path of the marker, different combinations of sensors within the array disposed to become activated and de-activated via sensory communication with at least one source as the marker travels its path, said different combinations ranging from one sensor to multiple sensors activated by at least one source at different times during travel along the path by the marker; and (b) converting current combined activation/deactivation states of the sensors in the array into a digital signal representative of a current position for the marker along the path.

According to a third aspect, the APD invention is further embodied in a device for detecting the positional state of a geared assembly, comprising:
  a plurality of moving components in geared relationship;
  a plurality of said moving components each including a system further comprising:
    a marker affixed to the moving component and traveling along a predefined path as said component moves; and
    an array of at least two sensors deployed along at least a part of the path of the marker, different combinations of sensors within the array disposed to become activated and deactivated via sensory communication with at least one source as the marker travels its path, said different combinations ranging from one sensor to multiple sensors activated by at least one source at different times during travel along the path by the marker; and a converter, the converter disposed to convert current combined activation/deactivation states of sensors in each system into a digital signal representative of a current overall positional state.

According to a fourth aspect, the APD invention is further embodied in a positional detector, comprising: a moving component; a marker affixed to the moving component and traveling along a predefined path as said component moves; an array of at least two sensors deployed along at least a part of the path of the marker, different combinations of sensors within the array disposed to become activated and deactivated via sensory communication with at least one source as the marker travels its path, said different combinations ranging from one sensor to multiple sensors activated by at least one source at different times during travel along the path by the marker; and a converter, the converter disposed to convert current combined activation/deactivation states of sensors in the array into a digital signal representative of a current position for the marker along its path.

According to a fifth aspect, the APD invention is embodied in a device for detecting the position of a rotating member traveling in pendulum motion, the device comprising: a source affixed to the member, the source moving in reciprocating motion along a path described by a circular arc; an array of at least three sensors deployed equidistantly around the path of the source, different combinations of sensors within the array disposed to become activated and deactivated via sensory communication with at least one source as the source travels its path, said different combinations ranging from one sensor to multiple sensors activated by at least one source at different times during travel along the path by the source; and a converter, the converter disposed to convert current combined activation/deactivation states of sensors in the array into a digital signal representative of a current position of the member.

It will therefore be seen that a technical advantage of the APD invention is that it relies on both normal and abnormal state detection in determining absolute position. The invention further eliminates the need for mechanical structure whose sole purpose in prior art APDs has been to avoid abnormal state detection. Both of these advantages contribute to an APD that is robust and reliable. Moreover, the APD is no longer limited to a best possible detection resolution that is defined by the physical number of sensors in an array. Best possible resolution in the inventive APD is defined by the number of discrete activation/deactivation states of the array that the source can activate during travel of the marker. Using binary state sensors such as Hall Effect devices, for example, it will be seen that there are potentially up to $2^n$ discrete activation/deactivation states of an array having n sensors.

A further technical advantage of the APD invention is that it is well suited to high speed digital service. Being non-contact in nature, the inventive APD avoids all the operational speed limitations of mechanical APDs of the prior art. Further, the inventive APD detects current absolute position using a current activation/deactivation state of the sensors as a basis. Hardware and software techniques are well suited to conversion of a stream of such current activation/deactivation states into a digital signal at high speed.

A yet further technical advantage of the APD invention is that it is scalable. A current activation/deactivation state of multiple interrelated arrays may easily be resolved into a current positional state of a moving assembly. If desired, such overall resolution may be accomplished more efficiently by concurrent hardware or software monitoring of the combined condition of all arrays, as opposed to monitoring individual arrays and then aggregating the results in a separate operation.

Another technical advantage of the APD invention is that it is bidirectional. This advantage applies whether the invention is embodied on a closed loop or open path system. In either type of system, the inventive APD operates regardless of the direction of travel, since detection of absolute position is based on a monitored current activation/deactivation state of the sensor array. Moreover, it will be appreciated that for the same reason, the inventive APD operates to detect absolute position in the presence of reciprocating motion.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

Embodiments of the APD invention are described with respect to an APD monitoring the condition of a valve actuator. The APD in a first embodiment comprises a system of interrelated circular gears that each deploy markers following endless loop paths of travel. This system of gears is coupled to the gear mechanism of the valve actuator that actually opens and closes the valve. The relative positions of the markers as monitored by the APD is thus able to indicate the current state of openness of the valve. The APD in a second embodiment comprises a torque sensing member that reciprocates along an open path of travel converting rotary to pendulum-like motion. This APD senses and indicates the amount of torque currently being delivered by the actuator in opening or closing the valve or mechanism.

Figure 1A:
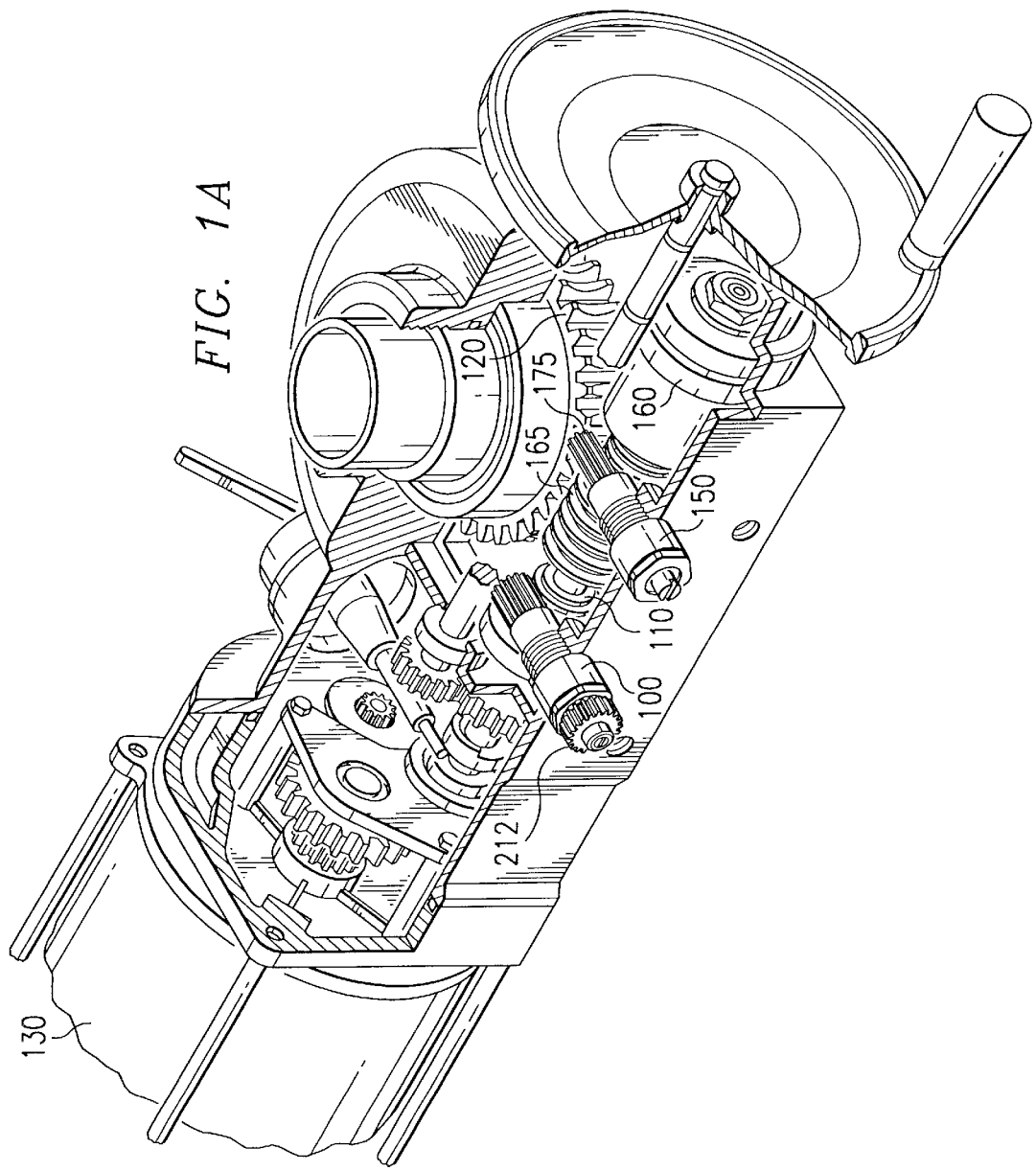
FIGS. 1A and 1B are cutaway views of a valve actuator to which embodiments of the APD invention may be attached via absolute position detector pinion assembly 100 and torque sensor pinion assembly 150.

FIG. 1A is a general arrangement drawing of the exemplary valve actuator in cutaway view. It will be seen that position detector assembly 100 is coupled via linkage including helical gear 110 to the main worm drive gear 120. As will be illustrated momentarily with reference to FIG. 1D position detector assembly 100 drives a gear mechanism illustrated further on FIGS. 2 through 4. This mechanism operates to provide a valve position detector embodying the APD invention. With further reference to FIG. 1A, worm drive gear 120 opens and closes the valve responsive to rotation of motor 130. Motor 130 activates worm drive gear 120 to open and close the valve between predefined fully open and fully closed positions. Movement of worm drive gear 120 between those positions thus generates corresponding rotation of position detector assembly 100.

Figure 5:
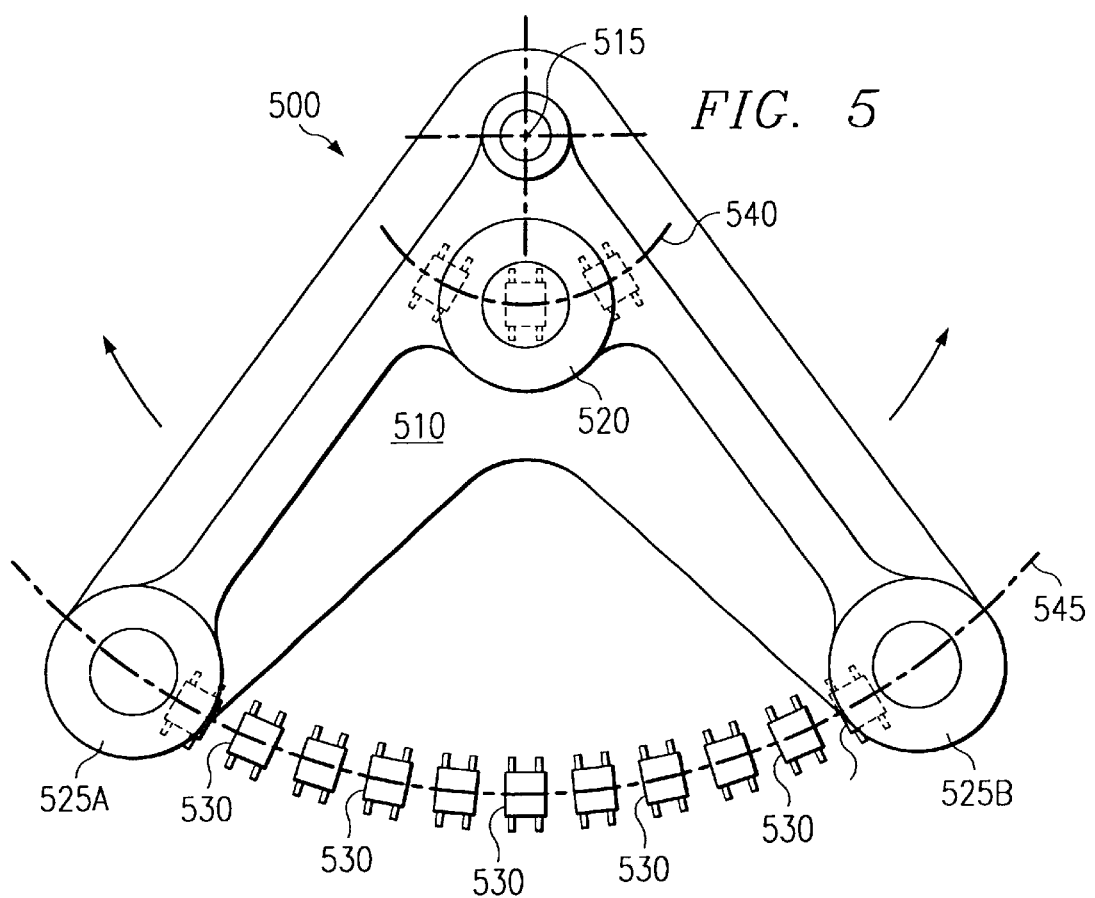
FIG. 5 is an enlargement of selected parts depicted on FIG. 1E.

FIG. 1A further shows torque sensor pinion 150 also coupled to worm drive gear 120. As will be illustrated momentarily with reference to FIGS. 1D and 1E, torque sensor pinion assembly 150 drives a pendulum-like mechanism illustrated further on FIG. 5. This pendulum-like mechanism senses different levels of torque applied by motor 130 to worm drive gear 120. With further reference to FIG. 1A, it will be seen that torque sensor pinion assembly 150 can sense this torque via main worm shaft 165 working against spring assembly 160. The torque sensor mechanism of FIG. 5 is a second embodiment of the APD invention and will be discussed in greater detail later.

Figure 1B:
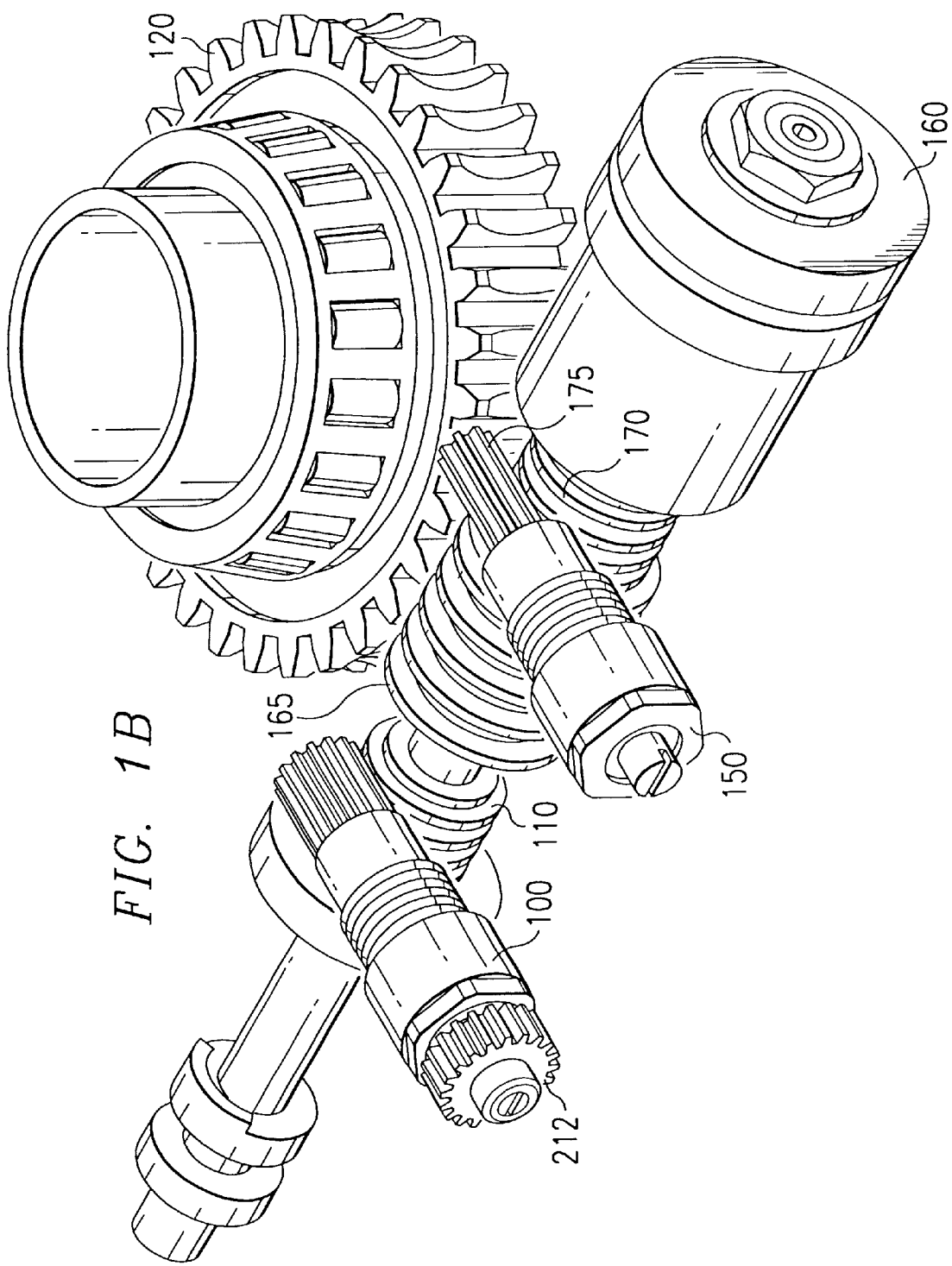

FIG. 1B is a more detailed cutaway view of FIG. 1A. The interrelation of motor 130, gear limit position detector assembly 100, helical gear 110, worm drive gear 120, torque sensor pinion assembly 150, spring assembly 160, main worm shaft 165, torque linkage pinion 175 and worm torque rack 170 can be seen in more detail.

Figures 1C, 1D:
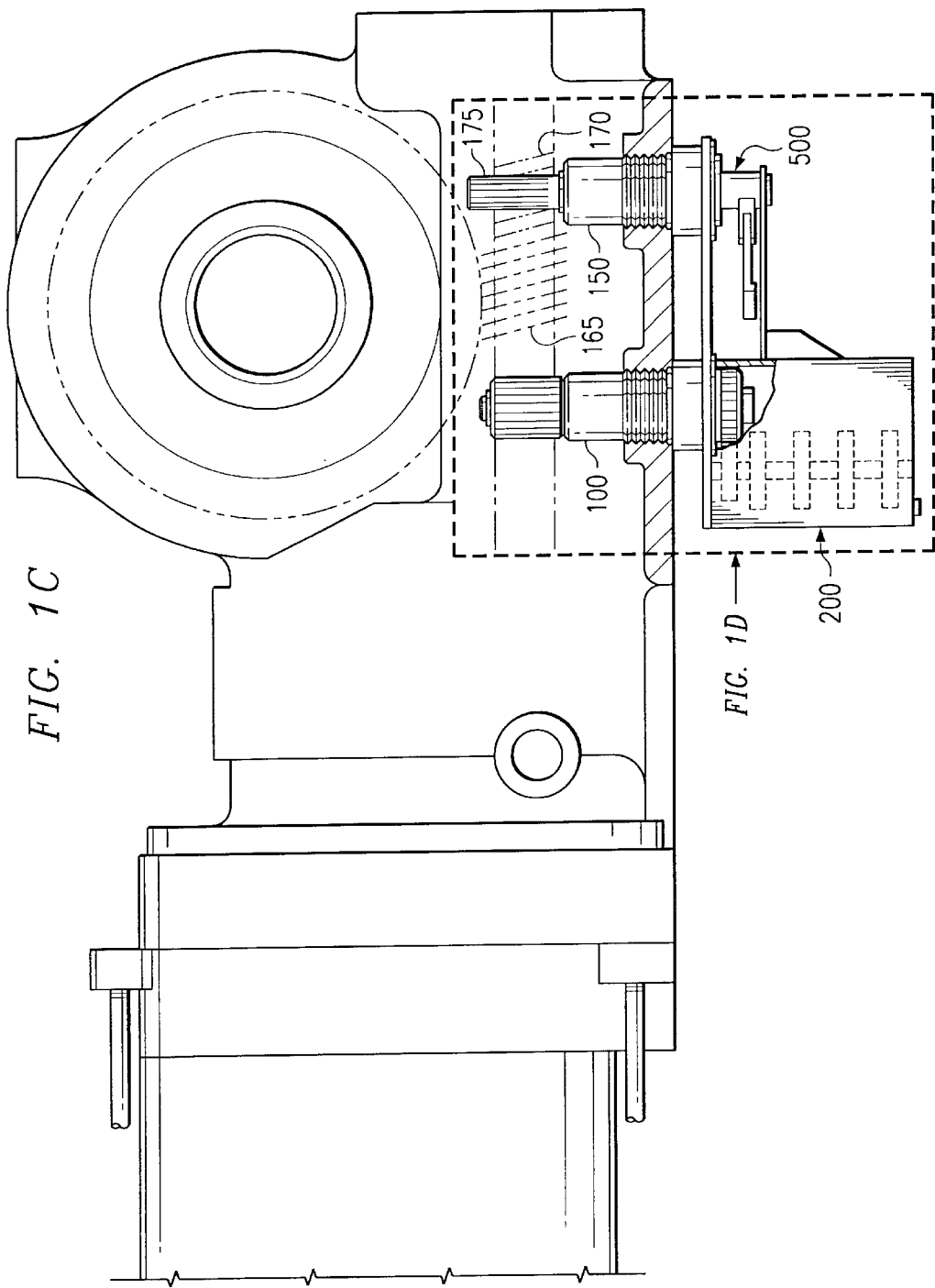
FIG. 1C is a plan view of the valve actuator illustrated in FIGS. 1A, 1B and 1C, shown in cutaway outline form to depict position detector pinion 100 and torque sensor pinion 150 linked to embodiments of the APD invention.
FIG. 1D is an enlargement as shown on FIG. 1C.
Figure 1D:
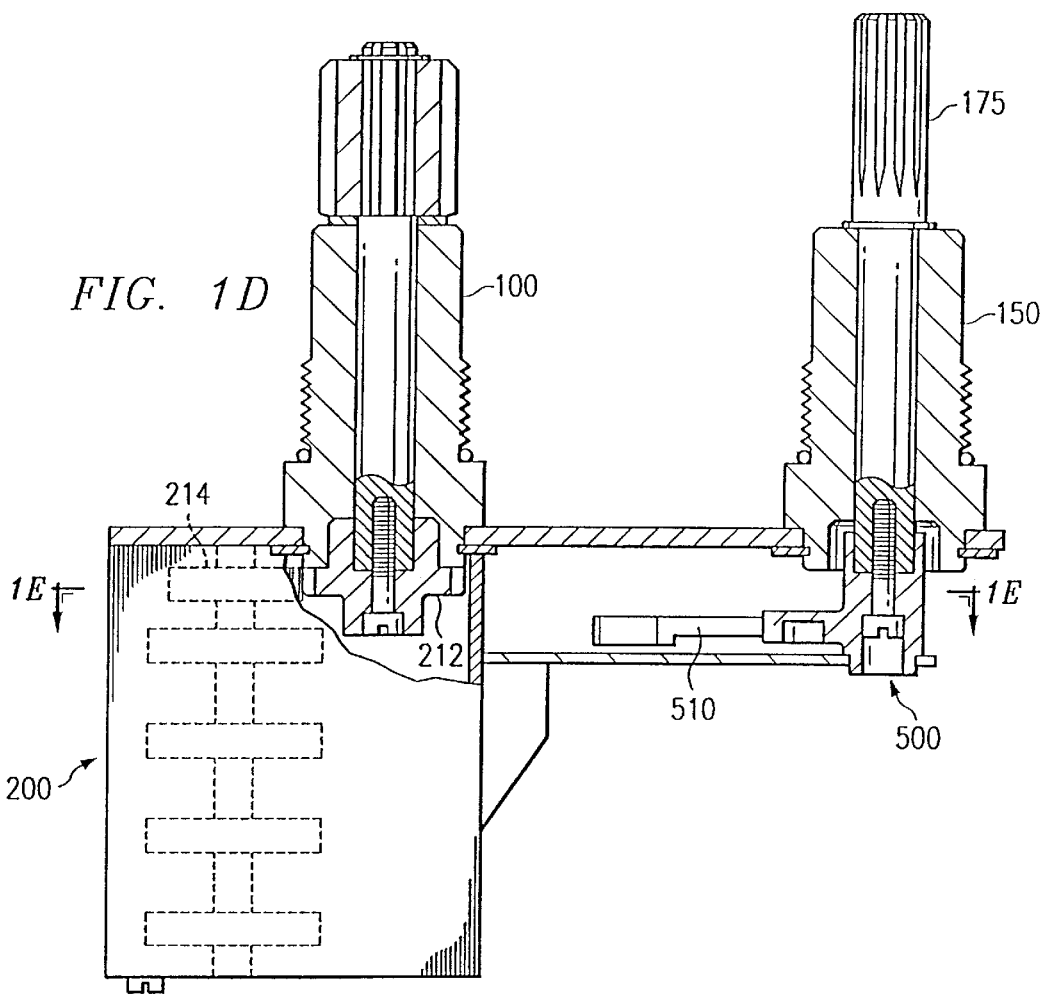

FIG. 1C is a plan view of the valve actuator in cutaway outline form. Position detector pinion assembly 100 and torque sensor pinion assembly 150 will be evident from comparative reference to FIGS. 1A and 1B. It will be further seen on FIG. 1C that absolute position detector mechanism 200 is operatively linked to position detector pinion assembly 100, and that torque rotor mechanism 500 is operatively linked to torque sensor pinion assembly 150.

FIG. 1D is an enlargement as shown on FIG. 1C. Absolute position detector mechanism 200 will be discussed in greater detail momentarily. It will also be seen on FIG. 1D how rotation of torque sensor pinion assembly 150 causes corresponding pendulum-like rotation of torque arm 510 in torque sensor mechanism 500.

Figure 1E:
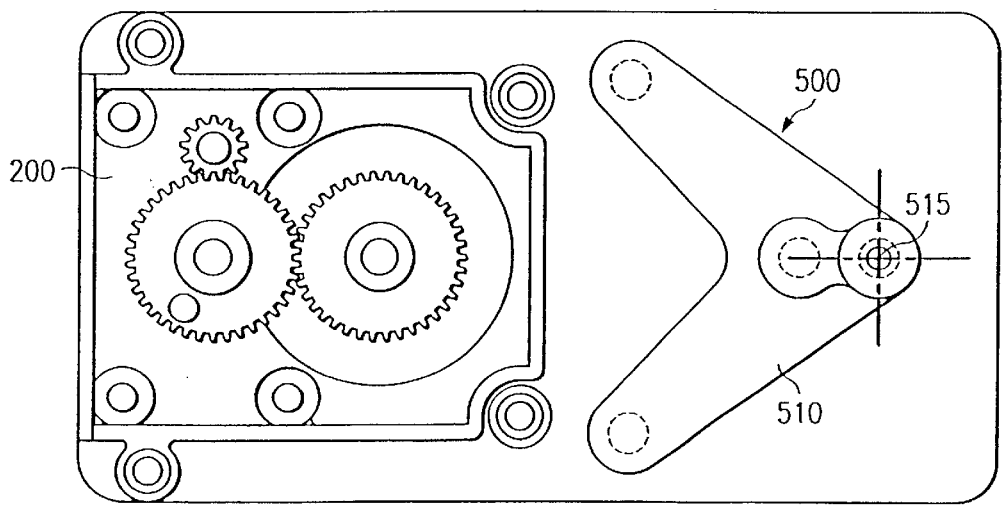
FIG. 1E is a section as shown on FIG. 1D.

FIG. 1E is a section as shown on FIG. 1D. Torque arm 510 rotating about axis 515 can be seen as part of torque sensor mechanism 500, described in greater detail later with reference to FIG. 5. The components of valve position detector mechanism 200 can also be seen as assembled. Selected components will now be described in conjunction with FIGS. 2, 3, and 4.

Figure 2:
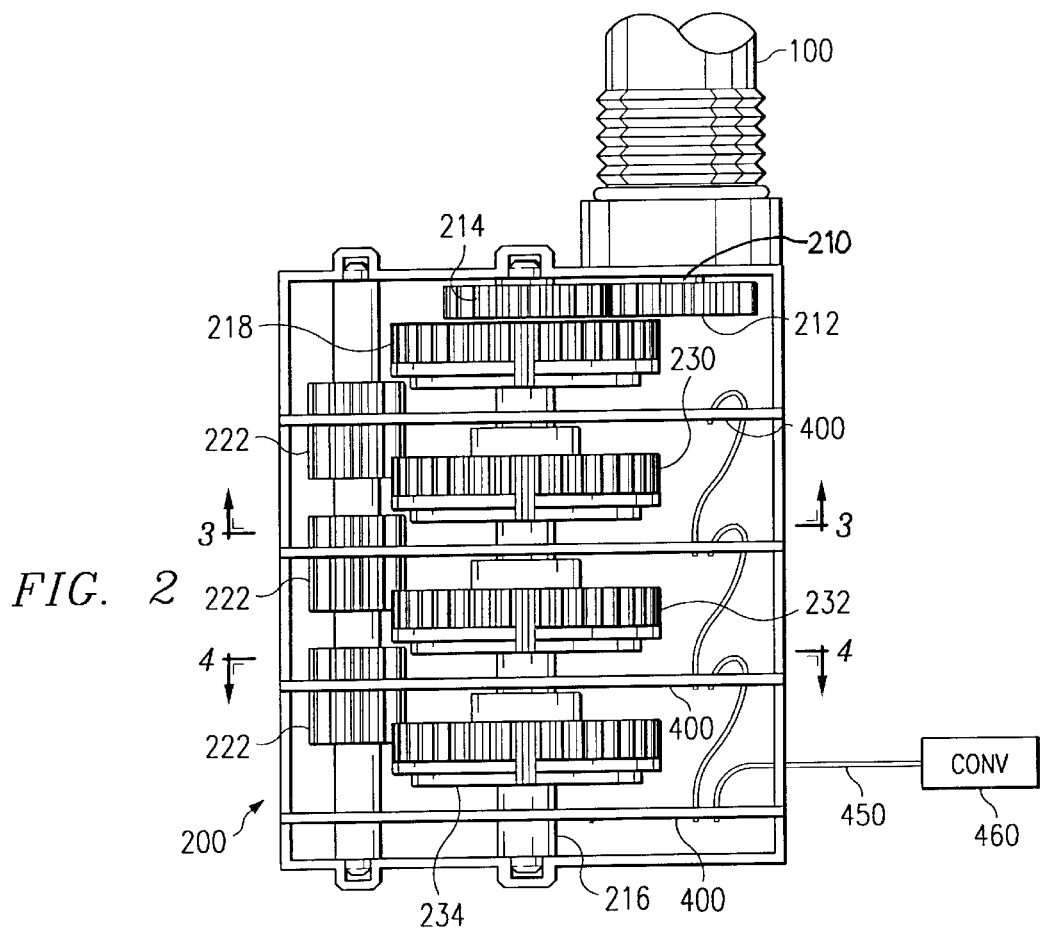
FIG. 2 is a cutaway view of valve position detector mechanism 200 depicted on FIGS. 1C, 1D and 1E.

FIG. 2 is an enlarged cutaway view of absolute position detector mechanism 200, previously seen from FIGS. 1C and 1D to be driven by position detector pinion assembly 100. FIGS. 1C and 1D depict input gear 212 on FIG. 2 to be operatively linked to the rotation of position detector pinion assembly 100.

Referring now to FIG. 2, input gear 212 rotates about input shaft 210, and drives lowest digit gears 218 via input drive gear 214. Digit gears 218, 230, 232 and 234 rotate independently around shaft 216, as is known in the art. It will be seen on FIG. 2 that digit gears 218, 230, 232 and 234 increment in sequence. It will be understood that the linkage between digit gears 218, 230, 232 and 234 enables counting of the revolutions of shaft 210. As one digit gear completes all or part of one rotation, a tooth or teeth thereon (see item 220 shown on FIG. 3) advances first incrementing gear 222, which in turn increments the next digit gear 230 in sequence by a predetermined rotation. A current relative positional state of digits gears 218, 230, 232 and 234 thus indicates the number of turns that shaft 210 has made since a preselected datum (such as predefined travel limit for the valve). It will be understood with reference to FIGS. 1A through 1D that the absolute position detector mechanism 200 illustrated in FIG. 2 is thus able to monitor and identify, via linkage through position detector pinion assembly 100, the current degree of openness of the valve.

Figure 3:
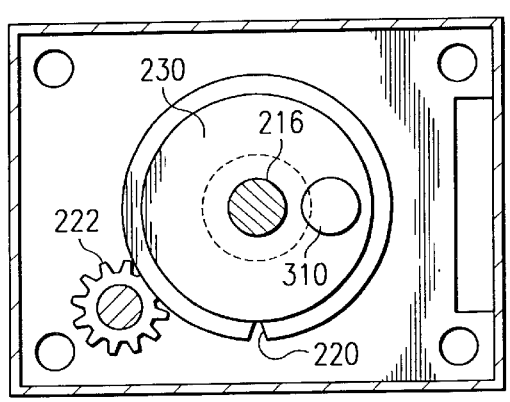
FIG. 3 is a sectional view as shown on FIG. 2.

FIG. 3 is a sectional view as shown on FIG. 2. It will be seen that as digit gear 230 makes its rotation, teeth 220 advance incrementing gear 222. FIG. 3 also depicts magnet 310 disposed on digit gear 230. Magnet 310 rotates with digit gear 230. It will be understood from FIG. 2 that FIG. 3 is also representative of the details of corresponding digit gears 218, 232 and 234, in that digit gears 218, 232 and 234 also have magnets 310 disposed thereon and rotating therewith.

Figure 4:
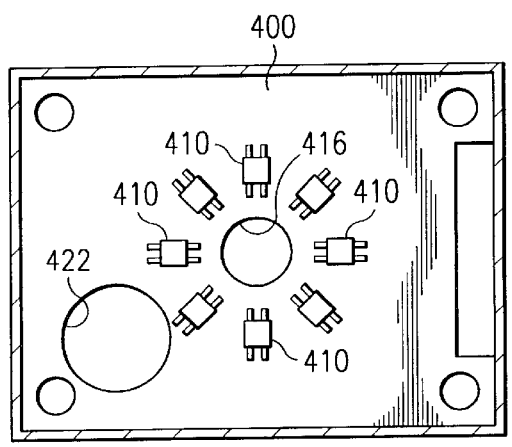
FIG. 4 is a further sectional view as shown on FIG. 2.

FIG. 4 is a further sectional view as shown on FIG. 2. FIG. 4 depicts a printed circuit board (PCB) 400 typical of PCBs 400 interposed between digit gears 218 and 230, 230 and 232, 232 and 234, and 234 and the casing of absolute position detector mechanism 200. Holes 416 and 422 are large enough to permit unimpeded rotation of the digit gears on shaft 216 and incrementing gears 222 respectively. PCB 400 further provides Hall Effect devices 410 in a circular array deployed to monitor movement of magnet 310 disposed on digit gears 218, 230, 232 and 234. Note that digit gears 218, 230, 232 and 234 are omitted from FIG. 4, but will be understood from FIGS. 2 and 3 to be carrying magnets 310 thereon, and to be further keeping magnet 310 within the sensory range of at least one Hall Effect device deployed in the array on PCB 400.

With further reference to FIG. 2, it will be appreciated that, consistent with the depiction of FIG. 4, absolute position detector mechanism 200 further comprises additional PCBs 400. Each additional PCB 400 deploys additional circular arrays of Hall Effect devices 410 to monitor the movement of a magnet 310 on digit gears 218, 230 and 234. Bus 450 carries the collective signals of Hall Effect devices 410 on PCBs 400 to a converter 460. This converter 460, described functionally in more detail below, tracks the evolving combined momentary state of all of the Hall Effect devices 410 throughout the mechanism by taking successive samples thereof. Such sampling enables the overall positional state of digit gears 218, 230, 232 and 234 to be monitored, which in turn enables the current positional state of the valve actuator to be monitored.

It will be further appreciated from FIG. 4 that PCB 400 also provides printed circuitry (not illustrated) that connects Hall Effect devices 410 in such a way that signals therefrom can be monitored remotely. In the particular embodiment shown, PCBs 400 provide eight Hall Effect devices 410 each with open collector outputs. Hall Effect devices such as Serial No. DN6848S, available from Panasonic Corporation have been found to operate satisfactorily in this service. The eight outputs from the Hall Effect devices are pulled up to +5V logic supply by 10K Ohm resistors (maximum), 4.7K Ohms typical. The eight outputs of the sensors are input to a transparent latch IC such as a 74HC573 with three-state output. Each latch has a separate output enabled control line to allow multiplexing of the data to an 8-bit bus. All four latch ICs have a common latch control signal to ensure the current position of all digit gears is detected without time delay.

Of course it will be understood that the foregoing circuitry and component details on PCB 400 are illustrative only, and that the APD invention is not limited to any specific design or functionality of PCB 400. It will be further understood that the APD invention is not limited to the use of Hall Effect devices as a monitoring device. Moreover, where Hall Effect devices are used to monitor magnetic flux, the present APD invention is in no way limited to the particular Hall Effect device models used in the embodiments described. Those of ordinary skill in the art will be able to select different Hall Effect devices with known performance characteristics, and then deploy same in a chosen spatially-arranged array (or combination of arrays) to suit a specific application of the APD invention.

It will be appreciated from the above description that in accordance with the APD invention, no special provisions are made in absolute position detector mechanism 200 to identify and monitor predetermined normal states for magnets 310 moving in and out of the sensory range of particular Hall Effect devices 410. Contrary to the prior art, magnets 310 are free to generate signals in one or more Hall Effect devices as digit gears 218, 230, 232 and 234 move, regardless of whether momentary positions of magnets 310 generate normal or abnormal states in one Hall Effect device 410, or in a group thereof. An abnormal state in which more than one Hall Effect device senses the same magnet is still representative of an identifiable current position of the magnet. It will be understood that converter 460 can deduce such magnet positions from identification of the Hall Effect devices that are active, whether in a normal or abnormal state, and with reference if necessary to a prior identified normal position. Advantageously, however, careful design will ensure that the magnets and Hall Effect devices are selected and deployed such that a combination of activated Hall Effect devices indicates a unique position for the magnet.

The foregoing description of the first embodiment thus illustrates the APD invention as capable of interpreting both normal and abnormal states. It will be seen that Hall Effect devices 410 are disposed so as to encode the current positional state of the absolute position detector mechanism 200, regardless of whether the detected positional state finds magnets 310 in normal or abnormal states with respect to Hall Effect devices.

In this regard, it will be appreciated that the APD invention as described with reference to FIGS. 2 through 4 above is configured for magnets 310 to activate either one Hall Effect device 410 or a pair of adjacent Hall Effect devices. When the pair is detected to be activated, the position of the magnet may be identified as physically between the two. In this way, the four PCBs 400 on FIG. 4 each deploying eight Hall Effect devices in combination enable sufficient positional resolution for the APD to generate a 16-bit sample representative of the current overall activation/deactivation state of the sensors. It will nonetheless be appreciated that these parameters are design choices that have been found to be suitable for the specific valve actuator described, and that the APD invention is not limited in this regard.

The foregoing description also describes monitoring and detection of a positional state using magnetic flux as a communication medium between magnets as sources and Hall Effect devices as sensors. It will be further understood that the APD invention is not limited in this regard either. Other communications systems are available with equivalent enabling effect. For example, sources of visible light radiation, infrared radiation, ultraviolet radiation, ultrasound radiation, radioactive radiation, electrostatic charge, radio frequency radiation or microwave frequency radiation may be substituted to activate corresponding sensor devices.

The foregoing description further describes the source (i.e. magnet 310) moving as a marker within the sensory range of the sensors (i.e. Hall Effect devices 410). It will be understood that the APD invention is also not limited in this regard. The APD invention is equivalently enabled on an embodiment in which the source may be substantially stationary. In such embodiments, positional state is monitored and detected by the movement of markers comprising moving windows interposed between the source and the sensors.

FIG. 4 in the foregoing description further depicts the array of Hall Effect devices 410 as spatially equidistant. Again, it will be understood that the APD invention is not limited in this regard. In order to establish a desired monitoring and detection of a positional state, it may be desirable to use arrays of sensors spaced irregularly, and whose combined activation/deactivation states are capable of identifying special conditions. The ability of the APD invention to adapt to the use of irregularly-spaced arrays is yet a further benefit of positional monitoring and detection with reference to both normal and abnormal states.

Converter 460 illustrated in FIG. 4 may be enabled in alternative ways. The basic principle is that current positional state will be deduced via reference to truth table logic available to the converter. Such truth table logic is calibrated to identify the positions of markers, or the overall positional state of a series of markers, according to the currently sensed combined activation/deactivation states of the sensors.

The converter may be deployed as a processor driven by software. In this case, the processor is advantageously disposed to poll the current activation/deactivation states of the sensors and, via reference to a truth table, to translate same into a group of current individual source positions. The processor is then further disposed to resolve the group of current individual source positions into a digital signal representative of a current overall positional state. The converter according to this deployment may be embodied on software executable on a general purpose computer.

Alternatively, the converter may be deployed in hardware. In this case, the hardware is advantageously configured to monitor and detect changes in the current activation/deactivation states of the sensors. Then, via reference to truth table logic encoded in the hardware, the hardware uses such logic to convert the detected changes into a digital signal representative of a current overall positional state. The converter according to this deployment may be embodied on any of many commercially available forms of hardware circuitry, such as logic integrated circuits, a programmable gate array (PGA), a field programmable gate array (FPGA), a programmable logic array (PLA), a programmable logic device (PLD), an erasable programming logic device (EPLD), an application specific integrated circuit (ASIC) or other such similar devices.

The first embodiment has been described above with exemplary reference to an APD monitoring the opening and closing mechanism of a valve actuator. In this embodiment, as shown on FIGS. 2 and 3, magnets 310 are deployed on digit gears 218, 230, 232 and 234 and rotate in an endless circular loop. It will be appreciated that other embodiments of the APD invention may deploy movement of sources (or markers comprising windows for sources) on endless loops having other shapes.

Further, the APD invention may be embodied on mechanisms in which sources (or markers comprising windows for sources) travel on open paths. It will be appreciated that such travel will often reciprocate along the open paths, although the APD invention does not require reciprocating travel.

A second embodiment of the APD invention illustrates this open path alternative, as deployed on torque sensor mechanism 500 illustrated on FIGS. 1C, 1D, 1E and 5. By way of background, torque monitoring is a highly advantageous feature in valve actuation for several reasons. As a minimum all valves require a safety mechanism for stopping the motor when excessive torque is detected. Many valves also require that the valve be seated within a certain torque range. Too much torque could damage the valve by producing too much stress on the mechanical components. Too little torque might allow leakage by the seat that would not be desired by the process and could result in valve damage due to erosion of the seat. Preventative maintenance can also be implemented on the valve by analyzing the torque throughout the life of the valve and actuator.

FIG. 1B illustrates in detail a mechanism in which the rotation of worm shaft 165 causes main worm drive gear 120 to rotate. Opening the valve causes drive gear 120 to rotate in one direction, and closing the valve causes it to rotate in the other direction. The torque delivered by worm shaft 165 also generates a corresponding axial force against worm drive gear 120 encouraging worm shaft 165 to displace laterally along its axis of rotation against spring assembly 160. Again, opening the valve causes worm shaft 165 to displace towards spring assembly 160, and closing the valve causes worm shaft 165 to displace away from spring assembly 160. The greater the torque, the greater the lateral displacement of worm shaft 165.

With further reference to FIGS. 1B and 1C, it will be seen that the lateral displacement of worm shaft 165 causes rack gear 170 to rotate torque linkage pinion 175 on torque sensor pinion assembly 150. Turning now to FIGS. 1C, 1D, and 1E, it will be understood that the rotation of pinion 175 responsive to lateral displacement of worm shaft 165 is translated via torque sensor pinion assembly 150 into corresponding rotation of torque arm 510 about axis 515.

FIG. 5 is an enlargement of corresponding parts on FIG. 1E, showing additional detail. It will be appreciated that the resulting motion of torque arm 510 about axis 515 is a pendulum-like movement, reciprocating back and forth along an open path of arc-like travel. It will be further appreciated that the degree of pendulum-like motion of torque arm 510 from a datum position represents a corresponding degree of displacement of worm shaft 165, which in turn represents a corresponding degree of torque generated by drive gear 120. Moreover, the direction of such pendulum-like motion of torque arm 510 from a datum position indicates an increase or decrease in torque from a calibrated datum level associated with the datum position of torque arm 510.

With further reference to FIG. 5, it will be understood that torque arm 510 is depicted in a datum position. Upper magnet 520 and lower magnets 525A and 525B are disposed on torque arm 510. During the pendulum-like motion of torque arm 510 about axis 515, it will be seen on FIG. 5 that magnets 520, 525A and 525B move in and out of the sensory range of Hall Effect devices 530 deployed in upper array 540 and lower array 545.

Applying the principles of the APD invention described above with respect to absolute position detector mechanism 200 on FIGS. 2, 3 and 4, it will be appreciated that the combined condition of arrays 540 and 545 on FIG. 5 may be monitored, and will identify the current position of torque arm 510 in its pendulum-like path. Specifically, as torque arm 510 displaces clockwise and counterclockwise, magnets 520, 525A and 525B will also displace clockwise and counterclockwise, tending to activate and deactivate different sets of Hall Effect devices 530 on upper array 540 and lower array 545.

As with absolute position detector mechanism 200 described above, converter (not shown on FIG. 5) monitors and detects the changing position of torque arm 510 via sampling of the combined activation/deactivation states of arrays 540 and 545, followed by reference to truth table logic calibrated to recognize particular combined activation/deactivation states as indicative of particular positions of torque arm 510. Then, via hardware, software or a combination thereof, the converter may convert such samples into a digital signal representative of the changes in position of torque arm 510 over time. In this way, it will be seen that the second embodiment of the APD invention functions as a torque sensor.

It will be again seen with reference to FIG. 5 that torque sensor mechanism 500 is unaffected by normal and abnormal states of individual Hall Effect devices 530 that may be activated or deactivated by magnets 520, 525A and 525B during motion of torque arm 510. As described above with respect to FIGS. 2, 3 and 4, if a particular position of torque arm 510 on FIG. 5 activates more than one Hall Effect device 530 in either array 540 or 545, that fact is accounted for in the truth table logic identifying torque arm 510 position from combined activation/deactivation states of the arrays. As a result, the resolution of the arrays to detect position of torque arm 510 is increased, and the need for mechanical structure to exclude abnormal states (as seen throughout the prior art) is obviated.

FIGS. 2 through 5 also demonstrate that the APD invention is both scalable and bidirectional. A current activation/deactivation state of multiple interrelated arrays may easily be resolved into a current positional state of a moving assembly. The number of such interrelated arrays may be scaled up or down. Also, the APD invention operates in bidirectional motion, whether in a closed loop or open path system.

Moreover, it will be appreciated from reference to the embodiments described in FIGS. 2 through 5 that the APD invention is well suited to high speed digital service. The APD invention is non-contact in nature. The APD invention thus avoids the operational speed limitations of many of its predecessors. Further, the invention operates by monitoring activation/deactivation states of groups of sensors. Hardware or software techniques are well suited to decoding of a stream of such activation/deactivation states into a digital signal at high speed.

Although the present invention and its advantages have been described in detail, it should be understood that various changes, substitutions and alterations can be made herein without departing from the spirit and scope of the invention as defined by the appended claims.

I claim:

1. A device for detecting the positional state of an incrementing multi-gear assembly, comprising:
   an assembly of components in geared relationship, each component disposed to rotate, said geared relationship enabling the rotation of one component to increment a next component in sequence;

a plurality of said components each including a system further comprising:
  a source affixed to the component and traveling along a predefined circular path as said component rotates; and
  an array of at least three sensors deployed equidistantly around the path of the source, different combinations of sensors within the array disposed to become activated and deactivated via sensory communication with the source as the source travels its path, said different combinations ranging from one sensor to multiple sensors activated by the source at different times during travel along the path by the source; and
  a converter, the converter disposed to convert current combined activation/deactivation states of sensors in each system into a digital signal representative of a current overall positional state for the assembly.

2. The device of claim 1, in which the converter includes a processor, the processor driven by software, the processor disposed to concurrently poll the sensors in each system and to individually detect a current combination of sensors activated and deactivated in each system, the processor further disposed, via reference to a truth table, to translate said individual detections into a group of current individual source positions, the processor further disposed to resolve said group of current individual source positions into a digital signal representative of a current overall positional state for the assembly.

3. The device of claim 1, in which the converter comprises:
  hardware configured to monitor each of the systems and, independently for each system, to detect changes in the current activation/deactivation states of the sensors therein; and
  truth table logic encoded in the hardware, the logic disposed to convert said detected changes into a digital signal representative of a current overall positional state of the assembly.

4. The device of claim 3, in which the hardware includes circuitry selected from the group consisting of:
  (1) logic integrated circuits;
  (2) a programmable gate array (PGA);
  (3) a field programmable gate array (FPGA);
  (4) a programmable logic array (PLA);
  (5) a programmable logic device (PLD);
  (6) an erasable programming logic device (EPLD); and
  (7) an application specific integrated circuit (ASIC).

5. The device of claim 1, in which the source is a magnet and in which the sensors are Hall Effect devices.

6. The device of claim 1, in which the source in at least one system comprises a plurality of individual sources affixed to the component at separate predetermined locations.

7. A method for establishing the position of a marker disposed to travel along a predefined path, the method comprising:
  (a) deploying an array of at least two sensors along at least a part of the path of the marker, different combinations of sensors within the array disposed to become activated and de-activated via sensory communication with at least one source as the marker travels its path, said different combinations ranging from one sensor to multiple sensors activated by at least one source at different times during travel along the path by the marker;
  (b) converting current combined activation/deactivation states of the sensors in the array into a digital signal representative of a current position for the marker along the path.

8. The method of claim 7, in which step (b) includes:
  (1) polling the sensors;
  (2) detecting a current combined activation/deactivation state of the sensors; and
  (3) via reference to a truth table, translating said detected current combined activation/deactivation state of the sensors into a digital signal representative of a current position for the marker along the path.

9. The method of claim 8, in which step (b) is accomplished by a processor driven by software.

10. The method of claim 7, in which step (b) includes:
  (1) monitoring the array;
  (2) detecting changes in the current activation/deactivation states of the sensors; and
  (3) via reference to a truth table, converting said detected changes into a digital signal representative of a current position for the marker along the path.

11. The method of claim 10, in which step (b) is accomplished by hardware including circuitry selected from the group consisting of:
  (1) logic integrated circuits;
  (2) a programmable gate array (PGA);
  (3) a field programmable gate array (FPGA);
  (4) a programmable logic array (PLA);
  (5) a programmable logic device (PLD);
  (6) an erasable programming logic device (EPLD); and
  (7) an application specific integrated circuit (ASIC).

12. The method of claim 7, in which the path of the marker is selected from the group consisting of:
  (1) an endless loop; and
  (2) a reciprocating path.

13. The method of claim 7, in which the path of the marker is an endless circular loop.

14. The method of claim 7, in which the path of the marker is a reciprocating path along a circular arc.

15. The method of claim 7, in which said at least one source is a single source co-located with the marker.

16. The method of claim 7, in which said sensory communication is via a medium selected from the group consisting of:
  (1) magnetic flux;
  (2) visible light radiation;
  (3) infrared radiation;
  (4) ultraviolet radiation;
  (5) ultrasound radiation;
  (6) radioactive radiation;
  (7) electrostatic charge;
  (8) radio frequency radiation; and
  (9) microwave frequency radiation.

17. The method of claim 7, in which step (b) is performed via reference to a truth table identifying marker positions that correspond to specific current combined activation/deactivation states of sensors.

18. The method of claim 7, in which the sensors are deployed in step (a) equidistantly along at least part of the path of the marker.

19. A device for detecting the positional state of a geared assembly, comprising:
- a plurality of moving components in geared relationship;
- a plurality of said moving components each including a system further comprising:
  - a marker affixed to the moving component and traveling along a predefined path as said component moves; and
  - an array of at least two sensors deployed along at least a part of the path of the marker, different combinations of sensors within the array disposed to become activated and deactivated via sensory communication with at least one source as the marker travels its path, said different combinations ranging from one sensor to multiple sensors activated by at least one source at different times during travel along the path by the marker; and
- a converter, the converter disposed to convert current combined activation/deactivation states of sensors in each system into a digital signal representative of a current overall positional state.

20. The device of claim 19, in which the converter includes a processor, the processor driven by software, the processor disposed to concurrently poll the sensors in each system and to individually detect a current combination of sensors activated and deactivated in each system, the processor further disposed, via reference to a truth table, to translate said individual detections into a group of current individual marker positions, the processor further disposed to resolve said group of current individual marker positions into a digital signal representative of a current overall positional state.

21. The device of claim 19, in which the converter comprises:
- hardware configured to monitor each of the systems and, independently for each system, to detect changes in the current activation/deactivation states of the sensors therein; and
- truth table logic encoded in the hardware, the logic disposed to convert said detected changes into a digital signal representative of a current overall positional state.

22. The device of claim 21, in which the hardware includes circuitry selected from the group consisting of:
(1) logic integrated circuits;
(2) a programmable gate array (PGA);
(3) a field programmable gate array (FPGA);
(4) a programmable logic array (PLA);
(5) a programmable logic device (PLD);
(6) an erasable programming logic device (EPLD); and
(7) an application specific integrated circuit (ASIC).

23. A positional detector, comprising:
- a moving component;
- a marker affixed to the moving component and traveling along a predefined path as said component moves;
- an array of at least two sensors deployed along at least a part of the path of the marker, different combinations of sensors within the array disposed to become activated and deactivated via sensory communication with at least one source as the marker travels its path, said different combinations ranging from one sensor to multiple sensors activated by at least one source at different times during travel along the path by the marker; and
- a converter, the converter disposed to convert current combined activation/deactivation states of sensors in the array into a digital signal representative of a current position for the marker along its path.

24. The positional detector of claim 23, in which the converter includes a processor, the processor driven by software, the processor disposed to poll the sensors and to detect a current combined activation/deactivation state of the sensors, the processor further disposed, via reference to a truth table, to translate said detection into a digital signal representative of a current position for the marker along its path.

25. The positional detector of claim 23, in which the converter comprises:
- hardware configured to monitor the array and to detect changes in the current activation/deactivation states of the sensors therein; and
- truth table logic encoded in the hardware, the logic disposed to convert said detected changes into a digital signal representative of a current position for the marker along its path.

26. The positional detector of claim 25, in which the hardware includes circuitry selected from the group consisting of:
(1) logic integrated circuits;
(2) a programmable gate array (PGA);
(3) a field programmable gate array (FPGA);
(4) a programmable logic array (PLA);
(5) a programmable logic device (PLD);
(6) an erasable programming logic device (EPLD); and
(7) an application specific integrated circuit (ASIC).

27. The positional detector of claim 23, in which said at least one source is a single source co-located with the marker.

28. A device for detecting the position of a rotating member traveling in pendulum motion, the device comprising:
- a source affixed to the member, the source moving in reciprocating motion along a path described by a circular arc;
- an array of at least three sensors deployed equidistantly around the path of the source, different combinations of sensors within the array disposed to become activated and deactivated via sensory communication with at least one source as the source travels its path, said different combinations ranging from one sensor to multiple sensors activated by at least one source at different times during travel along the path by the source; and
- a converter, the converter disposed to convert current combined activation/deactivation states of sensors in the array into a digital signal representative of a current position of the member.

29. The device of claim 28, in which the converter includes a processor, the processor driven by software, the processor disposed to poll the sensors in the array and to individually detect a current combined activation/deactivation state of sensors therein, the processor further disposed, via reference to a truth table, to translate said detection into a digital signal representative of a current position of the member.

30. The device of claim 28, in which the converter comprises:
- hardware configured to monitor the array and to detect changes in the current activation/deactivation states of the sensors therein; and truth table logic encoded in the hardware, the logic disposed to convert said detected changes into a digital signal representative of a current position of the member.

31. The device of claim 30, in which the hardware includes circuitry selected from the group consisting of:
   (1) logic integrated circuits;
   (2) a programmable gate array (PGA);
   (3) a field programmable gate array (FPGA);
   (4) a programmable logic array (PLA);
   (5) a programmable logic device (PLD);
   (6) an erasable programming logic device (EPLD); and
   (7) an application specific integrated circuit (ASIC).

32. A method for establishing the position of a marker disposed to travel along a predefined continuous path, the method comprising:
   (a) deploying an array of at least three sensors along at least a part of the path of the marker, different combinations of sensors within the array disposed to become activated and deactivated via sensory communication with at least one source as the marker travels its path, said different combinations ranging from one sensor to multiple sensors activated by at least one source at different times during travel along the path by the marker;
   (b) converting current combined activation/deactivation states of the sensors in the array directly, without intervening analog phase, into a digital signal representative of a current position for the marker along the path, said converting including translating the current combined activation/deactivation state of the sensors in the array even if two or more sensors are concurrently activated.

33. The method of claim 32, in which step (b) includes periodically referring to a prior known position for the marker in converting current combined activation/deactivation states of sensors in the array directly, without intervening analog phase, into a digital signal representative of a current position for the marker along the path.

34. The method of claim 32, in which step (b) includes:
   (1) polling the sensors;
   (2) detecting a current combined activation/deactivation state of the sensors; and
   (3) via reference to a truth table, translating said detected current combined activation/deactivation state of the sensors directly, without intervening analog phase, into a digital signal representative of a current position for the marker along the path.

35. The method of claim 34, in which step (b) is accomplished by a processor driven by software.

36. The method of claim 32, in which step (b) includes:
   (1) monitoring the array;
   (2) detecting changes in the current activation/deactivation states of the sensors; and
   (3) via reference to a truth table, converting said detected changes directly, without intervening analog phase, into a digital signal representative of a current position for the marker along the path.

37. The method of claim 36, in which step (b) is accomplished by hardware including circuitry selected from the group consisting of:
   (1) logic integrated circuits;
   (2) a programmable gate array (PGA);
   (3) a field programmable gate array (FPGA);
   (4) a programmable logic array (PLA);
   (5) a programmable logic device (PLD);
   (6) an erasable programming logic device (EPLD); and
   (7) an application specific integrated circuit (ASIC).

38. The method of claim 32, in which said at least one source is a single source co-located with the marker.

39. The method of claim 32, in which at least one source is remote from the marker, and in which the marker further comprises a traveling window interposed between said at least one remote source and the array, the window enabling said sensory communication between said at least one remote source and the sensors.

40. The method of claim 32, in which step (b) is performed via reference to a truth table identifying marker positions that correspond to specific current combined activation/deactivation states of sensors.

41. The method of claim 32, further comprising:
   (c) deploying independent systems of sensors, sources and markers according to step (a) on multiple moving parts in a geared assembly;
   (d) concurrently establishing current positions for markers according to step (b) for each of the independent systems; and
   (e) responsive to the results of step (d), establishing a current positional state of the geared assembly.

42. A method for establishing the position of a marker disposed to travel along a predefined reciprocating path, the method comprising:
   (a) deploying an array of at least three sensors along at least a part of the path of the marker, different combinations of sensors within the array disposed to become activated and deactivated via sensory communication with at least one source as the marker travels its path, said different combinations ranging from one sensor to multiple sensors activated by at least one source at different times during travel along the path by the marker;
   (b) converting current combined activation/deactivation states of the sensors in the array directly, without intervening analog phase, into a digital signal representative of a current position for the marker along the path, said converting including translating the current combined activation/deactivation state of the sensors in the array even if two or more sensors are concurrently activated.

43. A method for establishing the position of a marker disposed to travel along a predefined path, the method comprising:
   (a) deploying an array of at least three sensors along at least a part of the path of the marker, different combinations of sensors within the array disposed to become activated and deactivated via sensory communication with at least one source as the marker travels its path, said different combinations ranging from one sensor to multiple sensors activated by at least one source at different times during travel along the path by the marker;
   (b) converting current combined activation/deactivation states of the sensors in the array directly, without intervening analog phase, into a digital signal representative of a current position for the marker along the path, said converting including translating the current combined activation/deactivation state of the sensors in the array even if two or more sensors are concurrently activated.

44. The method of claim 43, in which the path of the marker is selected from the group consisting of:
  (1) an endless loop; and
  (2) a reciprocating path.

45. The method of claim 43, in which the path of the marker is an endless circular loop.

46. The method of claim 43, in which the path of the marker is a reciprocating path along a circular arc.

47. The device of claim 1, in which the converter is disposed to convert current combined activation/deactivation states of sensors in each system directly, without intervening analog phase, into a digital signal representative of a current overall positional state for the assembly.

48. The device of claim 1, in which the converter is disposed to convert current combined activation/deactivation states of sensors in each system into a digital signal representative of a current overall positional state for the assembly even if two or more sensors are concurrently activated.

49. The method of claim 7, in which the array includes at least three sensors.

50. The method of claim 7, in which step (b) includes translating current combined activation/deactivation states of the sensors in the array directly, without intervening analog phase, into a digital signal representative of a current position for the marker along the path.

51. The method of claim 7, in which step (b) includes translating current combined activation/deactivation states of the sensors in the array into a digital signal representative of a current position for the marker along the path even if two or more sensors are concurrently activated.

52. The device of claim 19, in which the array includes at least three sensors.

53. The device of claim 19, in which the converter is disposed to convert current combined activation/deactivation states of sensors each system directly, without intervening analog phase, into a digital signal representative of a current overall positional state.

54. The device of claim 19, in which the converter is disposed to convert current combined activation/deactivation states of sensors in each system into a digital signal representative of a current overall positional state even if two or more sensors are concurrently activated.

55. The device of claim 19, in which the predefined path of the marker is selected from the group consisting of:
  (1) an endless loop; and
  (2) a reciprocating path.

56. The positional detector of claim 23, in which the array includes at least three sensors.

57. The positional detector of claim 23, in which the converter is disposed to convert current combined activation/deactivation states of the sensors in the array directly, without intervening analog phase, into a digital signal representative of a current position for the marker along the path.

58. The positional detector of claim 23, in which the converter is disposed to convert current combined activation/deactivation states of the sensors in the array into a digital signal representative of a current position for the marker along the path even if two or more sensors are concurrently activated.

59. The positional detector of claim 23, in which the predefined path of the marker is selected from the group consisting of:
  (1) an endless loop; and
  (2) a reciprocating path.

60. The device of claim 28, in which the converter is disposed to convert current combined activation/deactivation states of sensors in the array directly, without intervening analog phase, into a digital signal representative of a current position of the member.

61. The device of claim 28, in which the converter is disposed to convert current combined activation/deactivation states of sensors in the array into a digital signal representative of a current position of the member even if two or more sensors are concurrently activated.

62. A system for monitoring a valve actuator, the system comprising:
  the valve actuator, the valve actuator comprising an assembly of components in geared relationship, the assembly of components disposed to move a valve between positions;
  a device for detecting the positional state of the valve actuator, the device comprising:
    an assembly of components in geared relationship, each component disposed to rotate, said geared relationship enabling the rotation of one component to increment a next component in sequence;
    a plurality of said components each including a position system further comprising:
      a position source affixed to the component and traveling along a predefined circular path as said component rotates; and
      an array of at least three position sensors deployed equidistantly around the path of the position source, different combinations of position sensors within the array disposed to become activated and deactivated via sensory communication with the position source as the position source travels its path, said different combinations ranging from one position sensor to multiple position sensors activated by the position source at different times during travel along the path by the position source; and
    a first converter, the first converter disposed to convert current combined activation/deactivation states of position sensors in each position system into a digital signal representative of a current overall positional state for the assembly; and
  a device for detecting a torque of the valve actuator, the device comprising:
    a rotating member traveling in pendulum motion;
    a torque source affixed to the member, the torque source moving in reciprocating motion along a path described by a circular arc;
    an array of at least three torque sensors deployed equidistantly around the path of the torque source, different combinations of torque sensors within the array disposed to become activated and deactivated via sensory communication with at least one torque source as the torque source travels its path, said different combinations ranging from one torque sensor to multiple torque sensors activated by at least one torque source at different times during travel along the path by the torque source; and
    a second converter, the second converter disposed to convert current combined activation/deactivation states of torque sensors in the array into a digital signal representative of a current position of the member.

63. The system of claim 62, in which the first converter periodically refers to a prior known positional state for the assembly in converting current combined activation/ deactivation states of position sensors in each system into a digital signal representative of a current overall positional state for the assembly.

64. The system of claim 62, in which the first converter includes a processor, the processor driven by software, the processor disposed to concurrently poll the position sensors in each system and to individually detect a current combination of position sensors activated and deactivated in each position system, the processor further disposed, via reference to a truth table, to translate said individual detections into a group of current individual position source positions, the processor further disposed to resolve said group of current individual position source positions into a digital signal representative of a current overall positional state for the assembly.

65. The system of claim 62, in which the first converter comprises:
   hardware configured to monitor each of the position systems and, independently for each position system, to detect changes in the current activation/deactivation states of the position sensors therein; and
   truth table logic encoded in the hardware, the logic disposed to convert said detected changes into a digital signal representative of a current overall positional state of the assembly.

66. The system of claim 65, in which the hardware includes circuitry selected from the group consisting of:
   (1) logic integrated circuits;
   (2) a programmable gate array (PGA);
   (3) a field programmable gate array (FPGA);
   (4) a programmable logic array (PLA);
   (5) a programmable logic device (PLD);
   (6) an erasable programming logic device (EPLD); and
   (7) an application specific integrated circuit (ASIC).

67. The system of claim 62, in which the position source is a magnet and in which the position sensors are Hall Effect devices.

68. The system of claim 62, in which the components rotate in continuous movement, and in which the first converter generates periodic samples of the current positional state for the assembly, a stream of said samples forming a computer-processable signal representative of changes in said overall positional state of the assembly over time.

69. The system of claim 62, in which the position source in at least one position system comprises a plurality of individual position sources affixed to the component at separate predetermined locations.

70. The system of claim 62, in which the second converter includes a processor, the processor driven by software, the processor disposed to poll the torque sensors in the array and to individually detect a current combined activation/deactivation state of torque sensors therein, the second processor further disposed, via reference to a truth table, to translate said detection into a digital signal representative of a current position of the member.

71. The system of claim 62, in which the second converter comprises:
   hardware configured to monitor the array and to detect changes in the current activation/deactivation states of the torque sensors therein; and
   truth table logic encoded in the hardware, the logic disposed to convert said detected changes into a digital signal representative of a current position of the member.

72. The system of claim 71, in which the hardware includes circuitry selected from the group consisting of:
   (1) logic integrated circuits;
   (2) a programmable gate array (PGA);
   (3) a field programmable gate array (FPGA);
   (4) a programmable logic array (PLA);
   (5) a programmable logic device (PLD);
   (6) an erasable programming logic device (EPLD); and
   (7) an application specific integrated circuit (ASIC).

73. A system for monitoring the positional state of a valve actuator, the system comprising:
   the valve actuator, the valve actuator comprising an assembly of components in geared relationship, the assembly of components disposed to move a valve between positions; and
   a device for detecting the positional state of the valve actuator, the device comprising:
      an assembly of components in geared relationship, each component disposed to rotate, said geared relationship enabling the rotation of one component to increment a next component in sequence;
      a plurality of said components each including a system further comprising:
         a source affixed to the component and traveling along a predefined circular path as said component rotates; and
         an array of at least three sensors deployed equidistantly around the path of the source, different combinations of sensors within the array disposed to become activated and deactivated via sensory communication with the source as the source travels its path, said different combinations ranging from one sensor to multiple sensors activated by the source at different times during travel along the path by the source; and
      a converter, the converter disposed to convert current combined activation/deactivation states of sensors in each system into a digital signal representative of a current overall positional state for the assembly.

74. The system of claim 73, in which the converter periodically refers to a prior known positional state for the assembly in converting current combined activation/deactivation states of sensors in each system into a digital signal representative of a current overall positional state for the assembly.

75. The system of claim 73, in which the converter includes a processor, the processor driven by software, the processor disposed to concurrently poll the sensors in each system and to individually detect a current combination of sensors activated and deactivated in each system, the processor further disposed, via reference to a truth table, to translate said individual detections into a group of current individual source positions, the processor further disposed to resolve said group of current individual source positions into a digital signal representative of a current overall positional state for the assembly.

76. The system of claim 73, in which the converter comprises:
   hardware configured to monitor each of the systems and, independently for each system, to detect changes in the current activation/deactivation states of the sensors therein; and
   truth table logic encoded in the hardware, the logic disposed to convert said detected changes into a digital signal representative of a current overall positional state of the assembly.

77. The system of claim 76, in which the hardware includes circuitry selected from the group consisting of:
  (1) logic integrated circuits;
  (2) a programmable gate array (PGA);
  (3) a field programmable gate array (FPGA);
  (4) a programmable logic array (PLA);
  (5) a programmable logic device (PLD);
  (6) an erasable programming logic device (EPLD); and
  (7) an application specific integrated circuit (ASIC).

78. The system of claim 73, in which the source is a magnet and in which the sensors are Hall Effect devices.

79. The system of claim 73, in which the components rotate in continuous movement, and in which the converter generates periodic samples of the current positional state for the assembly, a stream of said samples forming a computer-processable signal representative of changes in said overall positional state of the assembly over time.

80. The system of claim 73, in which the source in at least one system comprises a plurality of individual sources affixed to the component at separate predetermined locations.

81. A system for monitoring a torque of a valve actuator, the system comprising:
  the valve actuator, the valve actuator comprising an assembly of components in geared relationship, the assembly of components disposed to move a valve between positions; and
  a device for detecting the torque of the valve actuator, the device comprising:
    a rotating member traveling in pendulum motion;
    a source affixed to the member, the source moving in reciprocating motion along a path described by a circular arc;
    an array of at least three sensors deployed equidistantly around the path of the source, different combinations of sensors within the array disposed to become activated and deactivated via sensory communication with at least one source as the source travels its path, said different combinations ranging from one sensor to multiple sensors activated by at least one source at different times during travel along the path by the source; and
    a converter, the converter disposed to convert current combined activation/deactivation states of sensors in the array into a digital signal representative of a current position of the member.

82. The system of claim 81, in which the converter includes a processor, the processor driven by software, the processor disposed to poll the sensors in the array and to individually detect a current combined activation/deactivation state of sensors therein, the processor further disposed, via reference to a truth table, to translate said detection into a digital signal representative of a current position of the member.

83. The system of claim 81, in which the converter comprises:
  hardware configured to monitor the array and to detect changes in the current activation/deactivation states of the sensors therein; and
  truth table logic encoded in the hardware, the logic disposed to convert said detected changes into a digital signal representative of a current position of the member.

84. The system of claim 83, in which the hardware includes circuitry selected from the group consisting of:
  (1) logic integrated circuits;
  (2) a programmable gate array (PGA);
  (3) a field programmable gate array (FPGA);
  (4) a programmable logic array (PLA);
  (5) a programmable logic device (PLD);
  (6) an erasable programming logic device (EPLD); and
  (7) an application specific integrated circuit (ASIC).

* * * * *